US011122429B2

(12) United States Patent
Caira et al.

(10) Patent No.: US 11,122,429 B2
(45) Date of Patent: Sep. 14, 2021

(54) SYSTEM AND METHOD FOR CONTROLLING AIRPLANE-MODE IN A USER DEVICE

(71) Applicant: HCL TECHNOLOGIES ITALY S.P.A, Milan (IT)

(72) Inventors: Maria Teresa Caira, Rome (IT); Giuseppe Longobardi, Rome (IT); Elvira Zanin, Rome (IT); Ciro Oliviero, Rome (IT)

(*) Notice: Subject to any disclaimer, the term of this patent is extended or adjusted under 35 U.S.C. 154(b) by 236 days.

(21) Appl. No.: 16/228,320

(22) Filed: Dec. 20, 2018

(65) Prior Publication Data
US 2020/0204989 A1 Jun. 25, 2020

(51) Int. Cl.
H04W 12/06 (2021.01)
H04W 4/80 (2018.01)
H04W 76/10 (2018.01)
H04W 12/0431 (2021.01)

(52) U.S. Cl.
CPC ............ H04W 12/06 (2013.01); H04W 4/80 (2018.02); H04W 12/0431 (2021.01); H04W 76/10 (2018.02)

(58) Field of Classification Search
CPC ................................ H04W 12/06; H04W 4/80
USPC ........................................................... 726/6
See application file for complete search history.

(56) References Cited

U.S. PATENT DOCUMENTS 10,027,794 B2   7/2018 Liu
10,575,156 B2 * 2/2020 Shedletsky ........... H04W 76/27
2009/0235074 A1 * 9/2009 Salgarelli ................ G06F 21/34
                                                          713/169
2016/0227600 A1   8/2016 Shedletsky et al.

FOREIGN PATENT DOCUMENTS

CN          101478738      2/2011
CN          201985977      9/2011

* cited by examiner

Primary Examiner — Anthony D Brown
(74) Attorney, Agent, or Firm — Kendal Sheets

(57) ABSTRACT

A system for controlling airplane mode of a user device is configured to transmit a connection request to a telecommunication network for connecting with a target user device over a first communication channel. Upon receiving a call failure response from the telecommunication network the system is configured to transmitting a second communication request to the target user device through a second communication channel, wherein the second communication request comprises a target authentication key. The target user device is configured for generating an authentication response upon authentication of the second communication request based on the target authentication key. Further, the system is configured to transmit an activation signal to the target user device through the secondary communication channel for deactivating the airplane-mode and activate the first communication channel upon receipt of the activation signal.

9 Claims, 3 Drawing Sheets

SYSTEM AND METHOD FOR CONTROLLING AIRPLANE-MODE IN A USER DEVICE

CROSS-REFERENCE TO RELATED APPLICATIONS AND PRIORITY

The present application does not claim priority from any patent application.

TECHNICAL FIELD

The present disclosure in general relates to the field of mobile communication. More particularly, the present invention relates to a system and method for controlling airplane-mode in a mobile device.

BACKGROUND

Mobile phones are equipped with a functionality called airplane-mode which detaches it from the GSM network. As a consequence, when you set the airplane-mode in the mobile phone, any user cannot make a call to the mobile phone using GSM network. This is done to avoid unnecessary phone calls while the user is busy or resting.

But it can occur that someone in the vicinity on the phone is needs to urgently contact you. For example, someone from the family who is locked out the house door. The alternatives are to use different communication channels.

The problem is to reach out a phone that results offline because in airplane-mode, in case of emergency or urgent communications need, all this without disabling the airplane-mode for safety reasons.

SUMMARY

Before the present systems and method for controlling airplane-mode in a user device is illustrated, it is to be understood that this application is not limited to the particular systems, and methodologies described, as there can be multiple possible embodiments that are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for controlling airplane-mode in the user device. This summary is not intended to identify essential features of the claimed subject matter nor is it intended for use in determining or limiting the scope of the claimed subject matter.

In one implementation, a system for controlling airplane-mode in the user device is illustrated. The system comprises a memory and a processor coupled to the memory, wherein the processor is configured execute programmed instructions stored in the memory for transmitting a connection request to a telecommunication network for connecting with a target user device over a first communication channel. Further, the processor is configured to execute programmed instructions stored in the memory for receiving a call failure response from the telecommunication network, wherein the target user device is in airplane-mode. Further, the processor is configured to execute programmed instructions stored in the memory for transmitting a second communication request to the target user device through a second communication channel, wherein the second communication request comprises a target authentication key. In one embodiment, the target user device is configured for maintaining a set of authentication keys in a local repository, wherein each authentication key, from the set of authentication keys, is associated with a registered device from a set of registered devices. Further, the target user device is configured for comparing the target authentication key with the set of authentication keys to authenticate the second communication request and generating an authentication response upon authentication of the second communication request. Further, the processor is configured to execute programmed instructions stored in the memory for receiving the authentication response from the target user device through the second communication channel. Further, the processor is configured to execute programmed instructions stored in the memory for transmitting an activation signal to the target user device through the secondary communication channel, wherein the target user device is configured to deactivate the airplane-mode and activate the first communication channel upon receipt of the activation signal.

In one implementation, a method for controlling airplane-mode in the user device is illustrated. The method may comprise steps for transmitting a connection request to a telecommunication network for connecting with a target user device over a first communication channel. Further, the method may comprise steps for receiving a call failure response from the telecommunication network, wherein the target user device is in airplane-mode. Further, the method may comprise steps for transmitting a second communication request to the target user device through a second communication channel, wherein the second communication request comprises a target authentication key. In one embodiment, the target user device is configured for maintaining a set of authentication keys in a local repository, wherein each authentication key, from the set of authentication keys, is associated with a registered device from a set of registered devices. Further, the target user device is configured for comparing the target authentication key with the set of authentication keys to authenticate the second communication request and generating an authentication response upon authentication of the second communication request. Further, the method may comprise steps for receiving the authentication response from the target user device through the second communication channel. The method may comprise steps for transmitting an activation signal to the target user device through the secondary communication channel, wherein the target user device is configured to deactivate the airplane-mode and activate the first communication channel upon receipt of the activation signal.

In yet another implementation, a computer program product having embodied computer program for controlling airplane-mode in the user device is disclosed. The program may comprise a program code for transmitting a connection request to a telecommunication network for connecting with a target user device over a first communication channel. The program may comprise a program code for receiving a call failure response from the telecommunication network, wherein the target user device is in airplane-mode. The program may comprise a program code for transmitting a second communication request to the target user device through a second communication channel, wherein the second communication request comprises a target authentication key. In one embodiment, the target user device is configured for maintaining a set of authentication keys in a local repository, wherein each authentication key, from the set of authentication keys, is associated with a registered device from a set of registered devices. Further, the target user device is configured for comparing the target authentication key with the set of authentication keys to authenticate the second communication request and generating an authentication response upon authentication of the second communication request. The program may comprise a program code for receiving the authentication response from the target user device through the second communication channel. The program may comprise a program code for transmitting an activation signal to the target user device through the secondary communication channel, wherein the target user device is configured to deactivate the airplane-mode and activate the first communication channel upon receipt of the activation signal.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
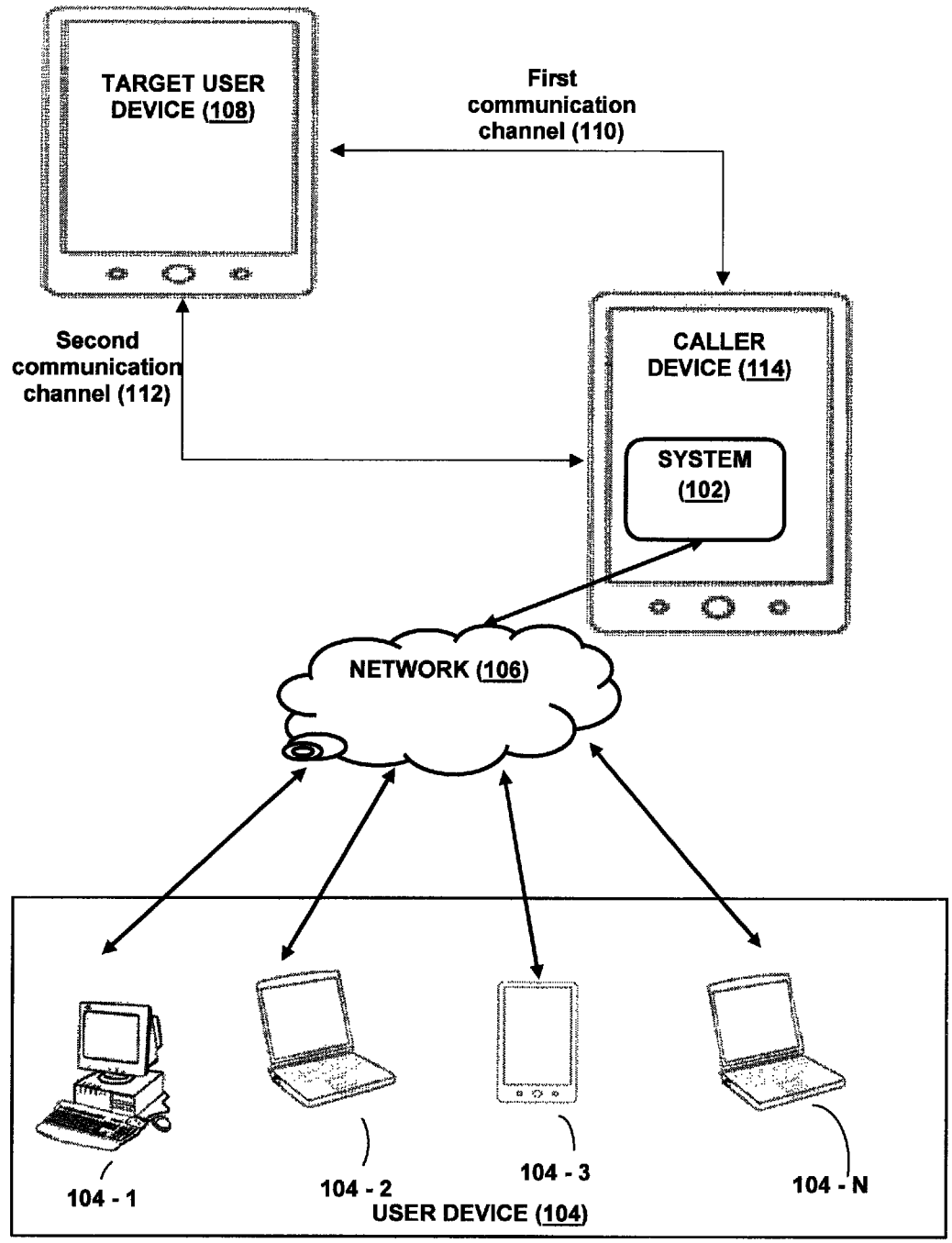
FIG. 1 illustrates a network implementation of a system configured for controlling airplane-mode in a user device, in accordance with an embodiment of the present subject matter.

Some embodiments of the present disclosure, illustrating all its features, will now be discussed in detail. The words "transmitting", "receiving", "maintaining", "comparing", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in controlling airplane-mode in a user device, the exemplary, systems and method for pre-processing of the image is now described.

Various modifications to the embodiment will be readily apparent to those skilled in the art and the generic principles herein may be applied to other embodiments. However, one of ordinary skill in the art will readily recognize that the present disclosure for controlling airplane-mode in a user device is not intended to be limited to the embodiments illustrated, but is to be accorded the widest scope consistent with the principles and features described herein.

The system enables controlling airplane-mode in a user device. In one embodiment, the system may be implemented over a mobile device. The proposed system and method may use the Bluetooth communication, adopting a new specific key in the connection protocol to provide a solution to the problem of reaching a user/mobile device, wherein the mobile is in airplane-mode. For this purpose, the system may enable a new proposed version of the airplane-mode ("offline with key code"), allows the offline device to be notified by Bluetooth, when the "emergency code (the key) previously agreed during the setup phase, is used, allowing to wake up the mobile phone. The proposed system offers the possibility to notify an offline mobile phone in case of emergency or urgent need. Based on the set-up selectable option different actions can be taken. The system also offers an alternative way to find a mobile phone which is in silent mode.

In one embodiment, the system is enabled over the requesting device that contacts the target user device in airplane-mode and triggers an application which based on a set of user preferences can let the user's phone ring, light up show a pop up box or use any other type or mixed type of notifications (such as vibration or transfer of the call to an associated different phone.

In one embodiment, the target user device is configured to enable a new airplane-mode. Once the new airplane-mode is activated on the target user device, in the next step, the target user device is configured to enable Bluetooth communication channel in case it is not already switched on the target device. Furthermore, upon receipt of a wakeup request from the system/other mobile device through the Bluetooth communication channel, the target user device validates the requestor and the received code, and based on the check results, the target user device takes the proper actions. In one embodiment, the target user device is configured for the new functionality set-up phase, the device must record the identifiers of all the phones which it can connect to in the "New Airplane Mode" when requested.

In one embodiment, the Bluetooth communication channel may enable communication with one to one devices and uses short radio waves in the frequency field of 2.45 gigahertz (Ghz). According to the Bluetooth protocol for establishing communication, by using the Bluetooth multi-point mode, any already connected device may be temporarily disconnected, when a new connection request arrives from the system. A software application on the target user device may drive the Bluetooth connection and the related action. In one embodiment, the triggered actions can also be customizable and related to specific requesters IDs. Moreover, some of the actions might also be routed to one or more smart devices connected to the target user devices, such as smartwatches or Bluetooth speakers. Further, the network implementation of system configured for controlling airplane-mode in a user device is illustrated with FIG. 1.

Referring now to FIG. 1, a network implementation 100 of a system 102 for controlling airplane-mode in a user device is disclosed. Although the present subject matter is explained considering that the system 102 is implemented on a server, it may be understood that the system 102 may also be implemented in a variety of computing systems, such as a mobile phone, laptop computer, a desktop computer, a notebook, a workstation, a mainframe computer, a server, a network server, and the like. In one implementation, the system 102 may be implemented over a server. Further, the system 102 may be implemented in a cloud network. In one embodiment, the system may be implemented as a Platform as a Service (PaaS). The system 102 may further be configured to communicate with a target user device 108 through a first communication channel 110 and second communication channel 112.

Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Hypertext Transfer Protocol Secure (HTTPS), File Transfer Protocol (FTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like. In one embodiment, the system 102 may be implemented over a caller's mobile device 114. Once a user places a voice call to the target user device 108 through the system 102, the process for handling the voice call is further elaborated with respect to FIG. 2.

Figure 2:
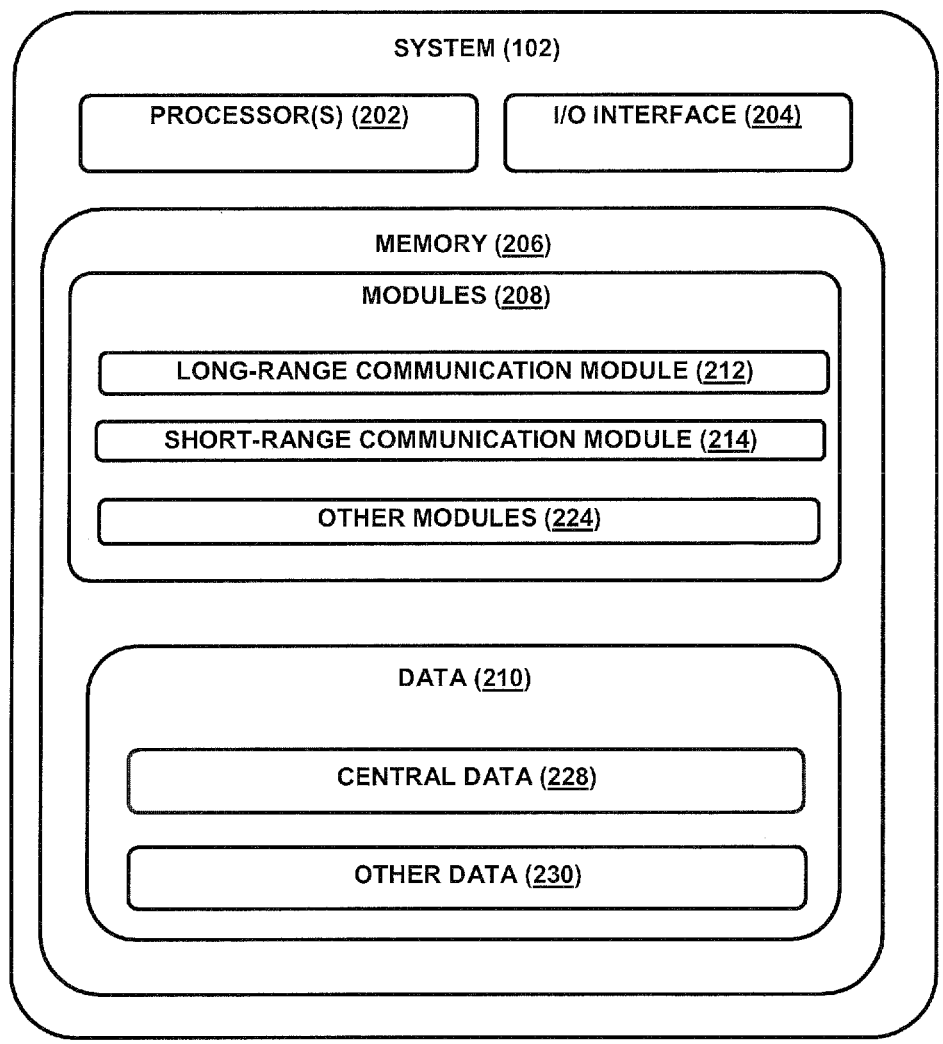
FIG. 2 illustrates the system configured for controlling airplane-mode in a user device, in accordance with an embodiment of the present subject matter.

Referring now to FIG. 2, the system 102 is configured for controlling airplane-mode in a user device in accordance with an embodiment of the present subject matter. In one embodiment, the system 102 may include at least one processor 202, an input/output (I/O) interface 204, and a memory 206. At least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the modules 208 may be configured to perform functions of the speech controller, visual face recognition & controller, and modulation & frame decomposer. The module 208 may include a Long-range communication module 212, a short-range communication module 214, and other modules 224. The other modules 224 may include programs or coded instructions that supplement applications and functions of the system 102.

The data 210, amongst other things, serve as a repository for storing data processed, received, and generated by one or more of the modules 208. The data 210 may also include a central data 228, and other data 230. In one embodiment, the other data 230 may include data generated as a result of the execution of one or more modules in the other modules 224.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102. The functioning of all the modules in the system 102 is described as below:

Long-Range Communication Module 212

In one embodiment, the Long-range communication module 212 may transmit a connection request to a telecommunication network for connecting with the target user device 108. The connection request may be transmitted over a first communication channel. The first communication channel may be a telecommunication channel such as GSM. The connection request may be in the form of voice call placed by a user using the caller device 114.

Further, the long range communication module 212 may receive a call failure response from the telecommunication network. The call failure response may be due to activation of airplane-mode at the target user device 108.

Short-Range Communication Module 214

In one embodiment, the Short-range communication module 214 may be configured to transmit a second communication request to the target user device 108 through a second communication channel. The second communication channel is a short-range communication channel. The short-range communication channel may be one of a Bluetooth communication channel, a RFID communication channel, and the like. The second communication request may comprise a target authentication key.

In one embodiment, the target user device 108 may be configured to maintain a set of authentication keys in a local repository. Each authentication key, from the set of authentication keys, may be associated with a registered device from a set of registered devices.

In one embodiment, upon receipt of the second communication request, the target user device 108 may be configured to compare the target authentication key with the set of authentication keys to authenticate the second communication request. Further, the target user device 108 may be configured to generate an authentication response upon authentication of the second communication request.

Further, the short-range communication module 214 may be configured to receive the authentication response from the target user device 108 through the second communication channel. The authentication response may be indicative of a valid/pre-authenticated user trying to reach the target user device 108. The authentication response may be generated, when the target authentication key matches an authentication key from the set of authentication keys.

Further, the short-range communication module 214 may be configured to transmit an activation signal to the target user device 108 through the secondary communication channel. The target user device 108 may be configured to deactivate the airplane-mode and activate the first communication channel upon receipt of the activation signal. The method for controlling airplane-mode in a user device is illustrated with respect to the flowchart of FIG. 3.

Figure 3:
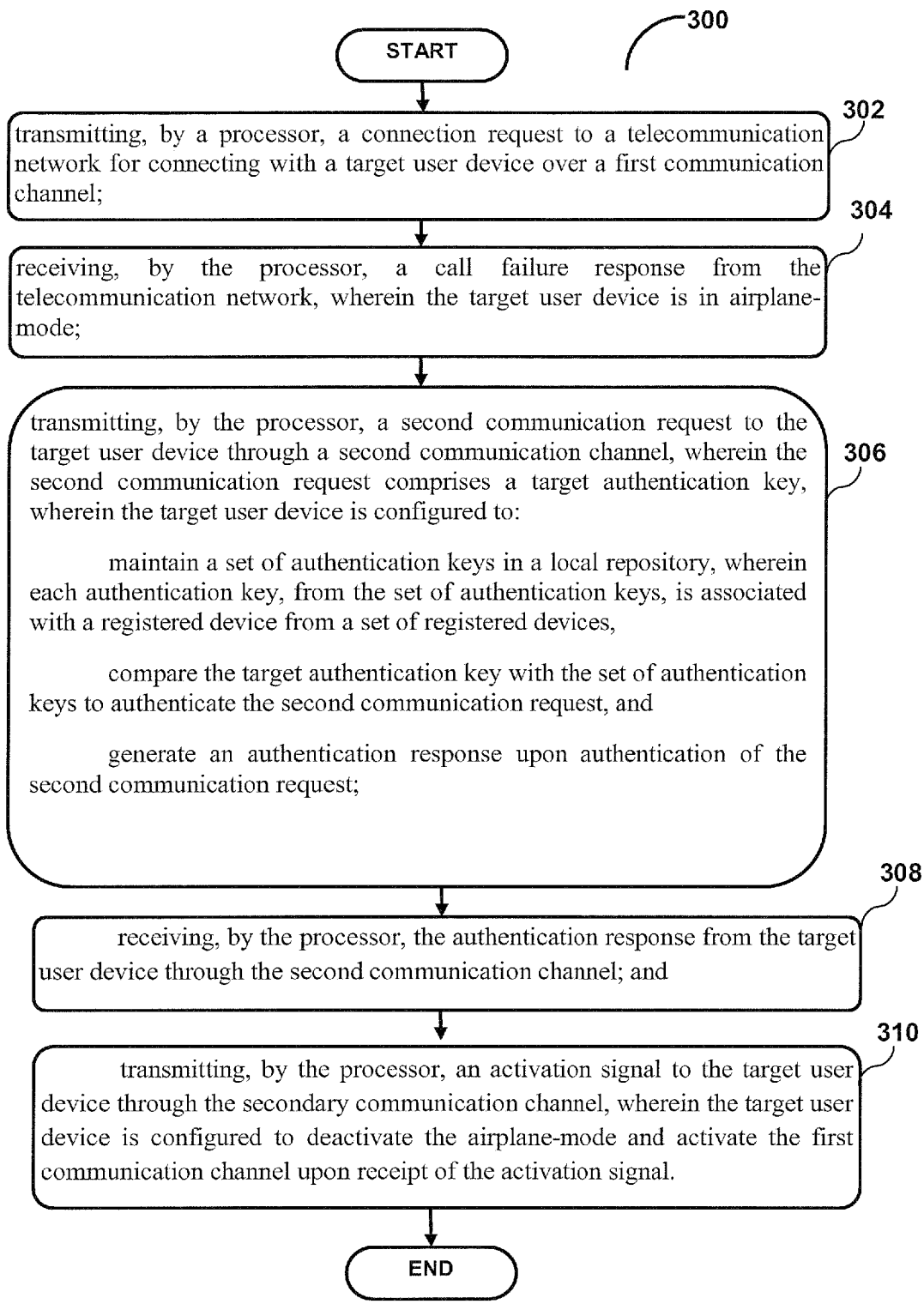
FIG. 3 illustrates a method for controlling airplane-mode in a user device, in accordance with an embodiment of the present subject matter.

Referring now to FIG. 3, a method 300 for controlling airplane-mode in a user device, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, a Long-range communication module 212 may transmit a connection request to a telecommunication network for connecting with the target user device 108. The connection request may be transmitted over a first communication channel. The first communication channel may be a telecommunication channel such as GSM. The connection request may be in the form of voice call placed by a user using the caller device 114.

At block 304, the long range communication module 212 may receive a call failure response from the telecommunication network. The call failure response may be due to activation of airplane-mode at the target user device 108.

At block 306, the Short-range communication module 214 may be configured to transmit a second communication request to the target user device 108 through a second communication channel. The second communication channel may be a short-range communication channel. The short-range communication channel may be one of a Bluetooth communication channel, a RFID communication channel, and the like. The second communication request may comprise a target authentication key.

In one embodiment, the target user device 108 may be configured to maintain a set of authentication keys in a local repository. Each authentication key, from the set of authentication keys, may be associated with a registered device from a set of registered devices.

In one embodiment, upon receipt of the second communication request, the target user device 108 may be configured to comparing the target authentication key with the set of authentication keys to authenticate the second communication request. Further the target user device 108 may be configured to generate an authentication response upon authentication of the second communication request.

At block 308, the short-range communication module 214 may be configured for receiving the authentication response from the target user device 108 through the second communication channel. The authentication response may be indicative of a valid/pre-authenticated user trying to reach the target user device 108. The authentication response may be generated when the target authentication key matches an authentication key from the set of authentication keys.

At block 310, the short-range communication module 214 may be configured to transmit an activation signal to the target user device 108 through the secondary communication channel. The target user device 108 may be configured to deactivate the airplane-mode and activate the first communication channel upon receipt of the activation signal.

Although implementations for systems and methods for controlling airplane-mode in a user device has been described, it is to be understood that the appended claims are not necessarily limited to the specific features or methods described. Rather, the specific features and methods are disclosed as examples of implementations for controlling airplane-mode in the user device.

We claim:

1. A system for controlling airplane-mode in a user device, the system comprising:
a memory;
a processor coupled to the memory, wherein the processor is configured to execute programmed instructions stored in the memory for:
transmitting a connection request to a telecommunication network for connecting with a target user device over a first communication channel;
receiving a call failure response from the telecommunication network, wherein the target user device is in airplane-mode;
transmitting a second communication request to the target user device through a second communication channel, wherein the second communication request comprises a target authentication key, wherein the target user device is configured to:
maintain a set of authentication keys in a local repository, wherein each authentication key, from the set of authentication keys, is associated with a registered device from a set of registered devices,
compare the target authentication key with the set of authentication keys to authenticate the second communication request, and
generate an authentication response upon authentication of the second communication request;
receiving the authentication response from the target user device through the second communication channel; and
transmitting an activation signal to the target user device through the secondary communication channel, wherein the target user device is configured to deactivate the airplane-mode and activate the first communication channel upon receipt of the activation signal.

2. The system of claim 1, wherein the first communication channel is a telecommunication channel.

3. The system of claim 1, wherein the second communication channel is short range communication channel, wherein the short range communication channel is one of a Bluetooth communication channel or an RFID communication channel.

4. The system of claim 1, wherein the authentication response is generated when the target authentication key matches an authentication key from the set of authentication keys.

5. A method for controlling airplane-mode in a user device, the method comprising steps of:

transmitting, by a processor, a connection request to a telecommunication network for connecting with a target user device over a first communication channel;

receiving, by the processor, a call failure response from the telecommunication network, wherein the target user device is in airplane-mode;

transmitting, by the processor, a second communication request to the target user device through a second communication channel, wherein the second communication request comprises a target authentication key, wherein the target user device is configured to:
- maintain a set of authentication keys in a local repository, wherein each authentication key, from the set of authentication keys, is associated with a registered device from a set of registered devices,
- compare the target authentication key with the set of authentication keys to authenticate the second communication request, and
- generate an authentication response upon authentication of the second communication request;

receiving, by the processor, the authentication response from the target user device through the second communication channel; and transmitting, by the processor, an activation signal to the target user device through the secondary communication channel, wherein the target user device is configured to deactivate the airplane-mode and activate the first communication channel upon receipt of the activation signal.

6. The method of claim 5, wherein the first communication channel is a telecommunication channel.

7. The method of claim 5, wherein the second communication channel is short range communication channel, wherein the short range communication channel is one of a Bluetooth communication channel or an RFID communication channel.

8. The method of claim 5, wherein the authentication response is generated when the target authentication key matches an authentication key from the set of authentication keys.

9. A computerized device having a processor and a non-transitory memory, the non-transitory memory having embodied thereon a computer program for controlling airplane-mode in a user device, the computer program comprising:

a program code for transmitting a connection request to a telecommunication network for connecting with a target user device over a first communication channel;

a program code for receiving a call failure response from the telecommunication network, wherein the target user device is in airplane-mode;

a program code for transmitting a second communication request to the target user device through a second communication channel, wherein the second communication request comprises a target authentication key, wherein the target user device is configured to:
- maintain a set of authentication keys in a local repository, wherein each authentication key, from the set of authentication keys, is associated with a registered device from a set of registered devices,
- compare the target authentication key with the set of authentication keys to authenticate the second communication request, and
- generate an authentication response upon authentication of the second communication request;

a program code for receiving the authentication response from the target user device through the second communication channel; and a program code for transmitting an activation signal to the target user device through the secondary communication channel, wherein the target user device is configured to deactivate the airplane-mode and activate the first communication channel upon receipt of the activation signal.

* * * * *